United States Patent [19]

Lambropoulos et al.

[11] Patent Number: 4,611,154
[45] Date of Patent: Sep. 9, 1986

[54] METHOD AND APPARATUS FOR CONTROLLING THE OPERATION OF A DC LOAD

[75] Inventors: George P. Lambropoulos, Groose Pt. Woods; Benjamin J. Charboneau, Wixom; David H. Eilola, Southfield, all of Mich.

[73] Assignee: Gulf & Western Manufacturing Company, Southfield, Mich.

[21] Appl. No.: 718,722

[22] Filed: Mar. 28, 1985

[51] Int. Cl.⁴ .............................................. H02P 1/04
[52] U.S. Cl. ................................. 318/490; 318/434; 324/177; 361/23
[58] Field of Search .............. 318/490, 641, 647, 650, 318/430, 434; 361/23, 24, 28, 29, 189, 190; 324/177

[56] References Cited

U.S. PATENT DOCUMENTS

| | | | |
|---|---|---|---|
| 2,073,645 | 3/1937 | Maurer | 361/29 X |
| 2,468,609 | 4/1949 | Whitehouse | 318/430 X |
| 3,242,475 | 3/1966 | Davis | 318/490 X |
| 3,942,111 | 3/1976 | Pfouts | 318/490 X |
| 4,379,986 | 4/1983 | Baxter et al. | 348/434 |

FOREIGN PATENT DOCUMENTS

| | | | |
|---|---|---|---|
| 52-26412 | 2/1977 | Japan | 318/490 |
| 56-83289 | 7/1981 | Japan | 318/490 |
| 56-83296 | 7/1981 | Japan | 318/490 |

Primary Examiner—William M. Shoop, Jr.
Assistant Examiner—Bentsu Ro
Attorney, Agent, or Firm—Body, Vickers & Daniels

[57] ABSTRACT

A control circuit and method for using the same in operating a power switch such as a relay, FET, etc., having conductive and nonconductive conditions and adapted to direct a high magnitude driving current from a power supply through an electric load circuit when the power switch is in the conductive condition. Such a power switch can be used to control small motors used extensively in motor vehicles. This control circuit comprises testing means for directing a low magnitude, low duty cycle testing current through the load or motor circuit while the power switch is in the nonconductive condition, sensing means for creating a control signal indicative of a predetermined electrical characteristic, such as current flow, in the load circuit, means for shifting the power switch into the conductive condition for energizing the load when the control signal from the sensing means has a predetermined value, i.e. exceeds a preselected level, and load protecting means for interrupting the high magnitude driving current passing through the load circuit when the driving current exceeds the preselected value. Preferably, the protective means involves no external resetting or time delay in operation.

59 Claims, 16 Drawing Figures

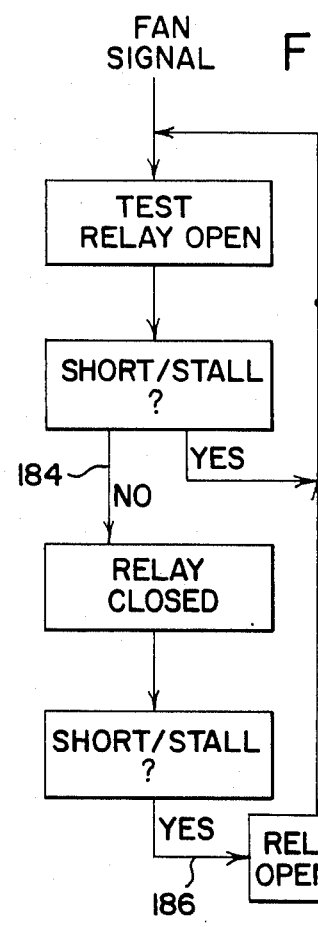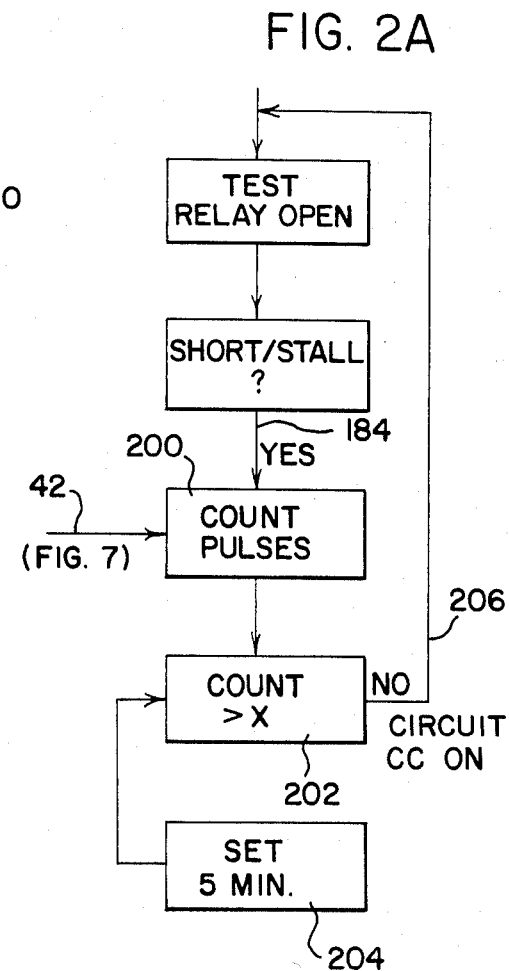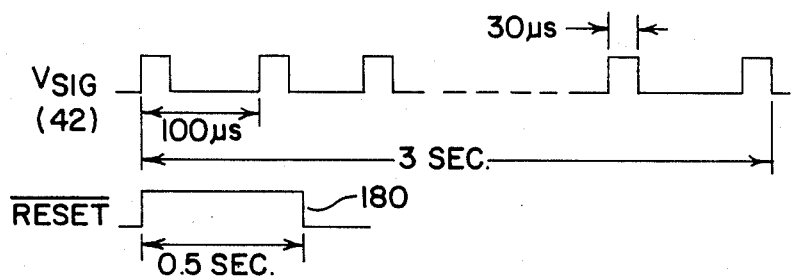

METHOD AND APPARATUS FOR CONTROLLING THE OPERATION OF A DC LOAD

The present invention relates to the art of controlling the operation of a DC load such as a DC motor used extensively in motor vehicles and more particularly to an improved control circuit for operating the power switch used in driving such a load.

The invention is particularly applicable for operation of the DC motor employed to cool the radiator of a motor vehicle or the blower motor for the air conditioning system of a motor vehicle and it will be described with particular reference thereto; however, the invention has much broader applications and may be employed for controlling any high production power switch of the type used for operating a DC load. The power switch can be a MOSFET, mechanical relay, etc., to name a few examples. The DC load is, in the preferred embodiment, the DC motor used for a fan or blower of a motor vehicle; however, the load may be the light circuit or circuits of a motor vehicle. The invention relates to protecting the load from damage, protecting the switch means from damage caused by high current actuation, detecting fault conditions of the load and providing a warning of fault conditions.

BACKGROUND OF INVENTION

In recent years, many motor vehicles have been designed in a manner that the drive shaft of the internal combustion engine can not be used to drive the cooling fan necessary for directing a convection air current across the radiator, which current is needed, especially when driving at slow speeds in hot weather. With the advent of the front wheel drive vehicles with transverse engines and limited air intake openings, many motor vehicles are now being manufactured with electric motors driving fans for cooling the radiators. These fans may be operated only when the radiator coolant temperature indicates a need for additional external cooling. Consequently, the cooling fans may be turned on only when the vehicle is stopped or operated in heavy traffic. These cooling fans may not be used for long periods such as during the depths of the winter in certain localities. Even with such diverse times when the fans are used, they must operate on demand. Otherwise, damage to the engine can result or the engine must be stopped immediately. Even though these fans are extremely critical, most drivers are unaware of their existence or their operation.

The motors driving these fans must operate after long periods of inactivity during which the motors may be subjected to adverse conditions, such as rain, salt from the road or physical obstructions. Thes fan motors are important and are relatively expensive. They can be damaged by high current flow through the armature winding when stalled or when shorted. A system is needed for automatically protecting the motors, even if stalled or shorted, from being subjected to continued activation which will result in permanent and costly damage to the motor, and in some instances, to the fan, operating relay and other components associated with the fan.

To operate cooling fan motors as described above, it is standard practice to provide a power relay which generally includes a printed circuit board with circuits for controlling the relay in response to a demand signal from the vehicle, i.e. when the coolant system requires external cooling by one or more fans. Such a power relay and printed circuit board containing the motor control circuits are relatively small and must be inexpensive since they are required by the millions by the automobile industry. In the past, these power relays included a coil controlled by a transistor circuit which placed the coil across the battery power supply in the vehicle whereby current flow through the coil would close normally opened contacts of the relay. When the fan was not needed, the transistor would interrupt current flow through the coil and the normally opened contacts of the relay would open. The combined power relay and associated printed circuit board are assembled into a single plug-in unit easily plugged into a socket in the engine compartment of a vehicle. Miniaturization and low cost are overriding requirements for this type of power relay and, as such, have limited the versatility of the known plug-in power relay units for operating the DC motors of a motor vehicle.

When using the standard plug-in power relays to control a motor driving a cooling fan, the relay contacts are closed and the power supply from the vehicle battery is applied across the motor. It has been found that a defective motor or a stalled motor can cause high current flow which will damage the motor. This causes one immediate disadvantage. A new fan motor is quite expensive. High current flow in the motor can also cause hazardous situations, such as combustion of the motor harness or other similar flammable situations. As can be seen, activating a stalled motor presents severe problems. If the motor is shorted, closing of the power relay contacts also causes extremely high currents to flow in the motor circuit with the same disastrous results. The high motor current, no matter what its origin, has a tendency to destroy the printed circuit board associated with the power relay and the associated control circuitry. Because of the miniaturization of the power relay for operating a motor in a motor vehicle, the criticality of the availability of the fan motor when needed, expense of replacing the fan motor when it is damaged and related demands on the plug-in power relay unit, there has been a need for some system to protect the motor from long term, high current operation without an increased size or cost or a decrease in reliability. The solution to these problems has generally involved the use of a circuit breaker, fuse or other device in the motor circuit to disconnect the circuit upon sustained, high current conditions. Such devices are slow in operation, need manual resetting and often are triggered when there is only a transistory condition in the motor itself. For instance, if the motor is stalled due to a physical obstruction, a protective fuse would trip due to the high current caused by the stalled condition of the motor. When the fuse trips, the motor is deactivated and will not operate even though the obstruction has been removed. Consequently, if the fuse operates and disconnects the motor, the engine may be operated without the fan during times when a fan is required. Also, circuit breakers and fuses are very slow and often drift in their detect range so that they have to have a relatively wide current band. Bimetal circuit breakers, series sensing elements and other standard arrangements for protecting the motor are equally susceptible to disadvantages mentioned above and, in many cases, are too big, expensive or complex for high production use on motor vehicles. All of these protective systems require a high current in the motor for detection; therefore, damage can result before the system has been actuated.

In some instances, a protective device such as a circuit breaker interrupts the current flow by opening the relay when high current is sensed. Then, the relay is closed and high current is again sensed to again open the relay. Repeated operation causes the relay contacts to erode or weld close. When a MOSFET or a bipolar device is employed as the power switch to the load, operation at high currents caused by a shorted or stalled motor can blow the FET or power transistor.

These same problems exist when a relay is operated to direct a high current to other DC loads such as lighting circuits of a motor vehicle.

As will be apparent, the invention is used to monitor load circuits used extensively in motor vehicles, such as a DC fan and blower motors, DC lighting circuits, DC motors for power windows and power seats, windshield motors, etc. Primary emphasis will be on a DC motor for the cooling fan since this presents a more critical situation threatening the actual operation of the vehicle; however, such emphasis should not distract from general use in other DC load circuits of the small types used in motor vehicles.

THE INVENTION

The present invention relates to a circuit for operating a power switch of the type used to direct a high magnitude driving current from a power supply through an electric load circuit such as the type employed in motor vehicles, which new circuit overcomes all of the disadvantages of the standard arrangement for protecting the fan motor in a motor vehicle and exhibits further advantages of being easily miniaturized, low cost, useful as a substitute for existing plug-in relay units and capable of preventing damage of the load instead of just deactivating the power switch in response to a load damaging condition.

In accordance with the present invention, there is provided a control circuit for operating a power switch having opened and closed conditions and adapted to direct a high magnitude driving current from a power supply through an electric circuit when the power switch is in its closed condition. This control circuit comprises testing means for directing a low magnitude testing current through the load circuit while the power switch itself is in the opened condition, sensing means for creating a control signal indicative of a predetermined electrical characteristic, i.e. high current in the load circuit, shifting means for shifting the power switch into its closed condition when the control signal has a predetermined value, i.e. when the current is below a reference level, and protecting means for interrupting the high magnitude driving current through the load circuit when the driving current exceeds a predetermined value. This latter protecting means is in the control circuit and opens the power relay whenever high current is experienced by the motor in operation. Before operation of the load, such as a motor, by closing the power switch, a low magnitude testing current is supplied through the motor circuit for a short testing cycle, in the preferred embodiment 3.0 seconds.

In accordance with the invention, there is no high in-rush of current through a load when a load being tested is shorted or is in another condition which will cause destructively high current flow, such as a stalled DC motor. When a DC motor is the load being tested, a low current is passed through the motor for a short time, i.e. 3.0 seconds. If the motor rotates freely, the test will indicate operative conditions and the full current will then be applied to the motor or other tested load. In accordance with another aspect of the invention, the low current is increased at lower ambient temperatures when testing a motor; therefore, the motor will have more torque at lower temperatures to detect an actual stalled condition.

In accordance with an aspect of the invention, the average voltage of a capacitor charged to a voltage across the load itself determines the current flow through the load during a testing cycle. When the current flow exceeds a preselected value, indicative of a high current condition, such as a stalled or shorted motor, the power switch or relay is not energized. Consequently, the power switch is energized only when, during a testing cycle, the average voltage across the load or motor, as detected by the capacitor, is above a given value. The voltage detected is inversely proportional to the current flow through the load or motor. A low level current during the testing cycle closes the power switch. The capacitor is used in this manner. The power switch is not closed and high power is not applied to the load or motor until the testing cycle indicates that the motor is ready for normal operation. Usually the load is a DC motor used in a motor vehicle, such as a fan or blower motor, windshield wiper motor, etc. The invention will be described in such a motor environment since it establishes the basic use anticipated; however, other uses for small power loads, such as lighting circuits in motor vehicles are possible.

In accordance with another aspect of the invention, this testing cycle is repeated after a preselected delay to detect the condition of the load or motor at successive time intervals. The time delay is selected to allow the averaging capacitor to discharge between testing cycles. If the motor ultimately becomes free and capable of normal operation, a subsequent testing cycle will result in a sensed control signal which will shift the power switch or relay into the closed condition.

In accordance with another aspect of the invention, the low magnitude testing current during the testing cycle is a series of pulses created by the vehicle power supply. These pulses are created by gating current through a current limiting resistor. The pulsing has a duty cycle which reduces the magnitude of current flow from the battery to the motor during the testing cycle. By reducing the duty cycle of the transistor, current flow through the motor circuit is relatively low during the testing cycle even if there is a stall or short condition. This provides a "soft" start that lasts for a short time. The motor is not damaged by using this "soft" start concept. In practice, the testing cycle has a relatively high frequency and a relatively low duty cycle for each pulse so that spaced pulses of direct current are applied from the power supply through the current limiting resistor to the motor circuit for charging the detecting or sensing capacitor during the testing cycle.

In accordance with another aspect of the invention, the testing cycle is repeated after a preselected period of time so that successive testing cycles occur until the control circuit detects normal operation of the motor.

In accordance with another aspect of the invention, the pulses forming the testing cycle can be accumulated in a counter which will disconnect the testing cycle for a preselected time after a certain number of testing cycles have occurred. In this manner, the control circuit can rest and then periodically test the motor to determine whether it is in condition for normal operation.

In accordance with another aspect of the invention, the sensing means of the control circuit is a capacitor connected between a selected location on the motor circuit and chassis ground. This capacitor is charged rapidly through a resistor having relatively low resistance. In this manner, the voltage across the capacitor decreases when current flow through the motor increases. This provides a voltage divider concept wherein the capacitor charged voltage is indicative of the current condition of the motor. When the voltage is relatively low, high current flow exists in the motor and the power relay is not energized.

In accordance with another aspect of the present invention, the control circuit is provided with an arrangement for detecting when the motor circuit is opened. This can occur when the motor is missing, the motor is disconnected, or certain wires in the motor circuit have been broken. This condition is critical from the standpoint that the driver should be notified of its existence. By incorporating a separate comparator network in the control circuit, the power switch can be held in the inoperative or opened condition whenever an open load circuit condition exists. An indicator light can show this condition which can be corrected only by attending to the problem detected in the load circuit. In this manner, the control circuit will monitor the existence of the fan motor so that it would be impossible for a vehicle to be operated over long periods of time without the fan motor being actually connected or installed. By using this aspect of the invention, the switch is not operated when there is no fan motor. This situation is displayed within the vehicle compartment by the same indicator used for a high current condition in the motor. In this concept, the load could be other electrical devices.

In accordance with another aspect of the present invention, there is provided a control circuit, as defined above, which circuit comprises an auxiliary circuit for passing current from the battery power supply through the load circuit at least during a testing cycle. The auxiliary testing circuit includes a transistor and means for gating the transistor at a high frequency during the testing cycle to control the current flow while the switch is in the opened condition. This particular arrangement employs the capacitor previously mentioned to indicate current flow in the load circuit and includes means for shifting the power switch into the closed condition only when the capacitor voltage exceeds the preselected reference voltage. Further in accordance with this aspect of the invention, there is current responsive means for shifting the switch to the opened condition when the current flow through the load circuit exceeds a preselected value. In this manner, the load is protected from starting by the testing circuit which forms the primary aspect of the present invention. The ancillary aspect of using this testing circuit in combination with the current responsive shifting means provides an arrangement whereby the testing circuit becomes operative when, during normal operation, something happens to the motor, i.e. it is stalled or shorted. The combination of the testing concept and over-current protection in a single control system which can be miniaturized and placed on a small printed circuit board overcomes the disadvantages of prior control system for the fan motors used to cool the radiator of motor vehicles while maintaining needed design criteria. The same advantages are obtained in monitoring other DC motors and load circuits of motor vehicles.

The primary object of the present invention is the provision of a control circuit for controlling the power switch for a DC load of the type used on motor vehicles wherein the circuit can be combined within the relay package, is relatively low cost, requires no extra relays and can be miniaturized.

Another object of the present invention is the provision of a control circuit, as defined above, which control circuit employs concepts which can be incorporated into a semicustom integrated circuit adapted to be mounted onto a printed circuit board wherein only a transistor, resistor and power relay or switch are required as discrete components of the printed circuit board. By using this control circuit, the external load circuit can be coupled with the relay package at the assembly plant in a single plug-in operation.

Another object of the present invention is the provision of a control circuit of the type defined above, which control circuit employs intermittent interrogation of the motor or load circuit to determine its operative condition.

Yet another object of the present invention is the provision of a control circuit, as defined above, which control circuit does not cause repeated closing and opening of the power relay or switch during high current conditions. In accordance with this object, the relay is opened only once if a high current condition occurs after operation of the load and is not closed at all if the high current condition exists prior to starting the motor or load. This object is to reduce contact erosion and/or contact welding.

Another object of the present invention is the provision of a control circuit, as defined above, which control circuit uses a low duty cycle, low current testing signal for sensing fault conditions of a motor or other load used in a motor vehicle so that high current conditions need not be employed for the purpose of sensing such fault conditions.

Yet another object of the present invention is the provision of a control circuit, as defined above, which control circuit can also detect when there is no fan motor on the vehicle or the fan motor has been disconnected from the motor circuit inadvertently or otherwise. In this manner, the invention can indicate the existence of a no fan motor which protects against operation of a vehicle without a fan motor in place. In accordance with this object, the control circuit protects the engine of the vehicle during long term operation without a cooling fan.

Still a further object of the present invention is the provision of a control circuit as defined above, which control circuit monitors the condition of a DC motor without requiring disconnection of the fan motor from the circuit. In this manner, correction of the fault condition can result in immediate operation of the motor instead of requiring remedial efforts by the vehicle operator who is often not trained in these matters.

Still a further object of the present invention is the provision of a control circuit as defined above, which control circuit can be used for a variety of loads of the type used in motor vehicles, i.e. low voltage DC loads. Such loads may be motors or lighting circuits, to name two examples.

Yet another object of the invention is the provision of a control circuit that can protect various types of power switches used in load circuits, such as mechanical relays, MOSFETs or bipolar devices, to name three examples.

Another object of the present invention is the provision of a control circuit, as defined above, which control circuit can perform many functions of fault detection, component protection and fault warning. As examples, the circuit can (a) detect an open circuit and give a warning of this condition; (b) detect a stalled motor, protect the motor from high current, and give a warning of such stalled condition; (c) detect a shorted load, protect the load from high current, and give a warning of such a shorted condition; and, protect a power switch from high current switching.

Yet another object of the present invention is the provision of a control circuit, as defined above, which control circuit prevents high current in-rush, protects not only the load but also connecting harnesses, provides a protection against inductively induced negative voltages, and reduces voltage drops between the load and switch by placing the circuit in the engine compartment.

Another object of the present invention is the provision of a control circuit, as defined above, which control circuit can be miniaturized and placed inside the motor housing. This feature is directly applicable to use with small windshield wiper motors.

These and other objects and advantages will become apparent from the following description taken together with the accompanying drawings which are described below.

BRIEF DESCRIPTION OF DRAWINGS

FIG. 2 is a flow chart showing the method of operation contemplated in the preferred embodiment of the present invention;

FIG. 2A is a modification of the flow chart shown in FIG. 2 illustrating a counter concept, as shown schematically in FIG. 7;

FIG. 3 is a pulse diagram showing the high frequency pulses used during the testing cycle of the preferred embodiment of the present invention and a reset pulse which can be used to activate the control circuit;

PREFERRED EMBODIMENT OF THE INVENTION

Figure 1:
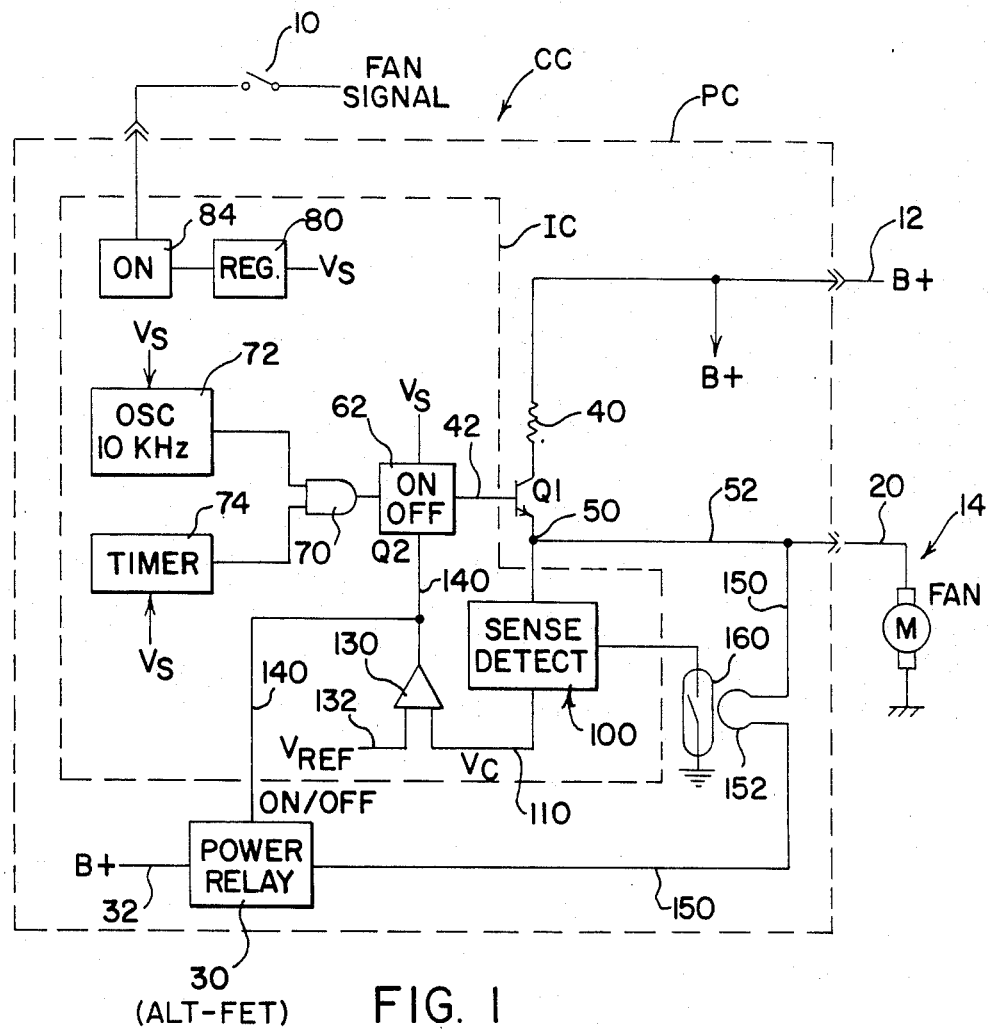
FIG. 1 is a schematic wiring diagram illustrating the basic components of the preferred embodiment of the present invention.
Figure 4:
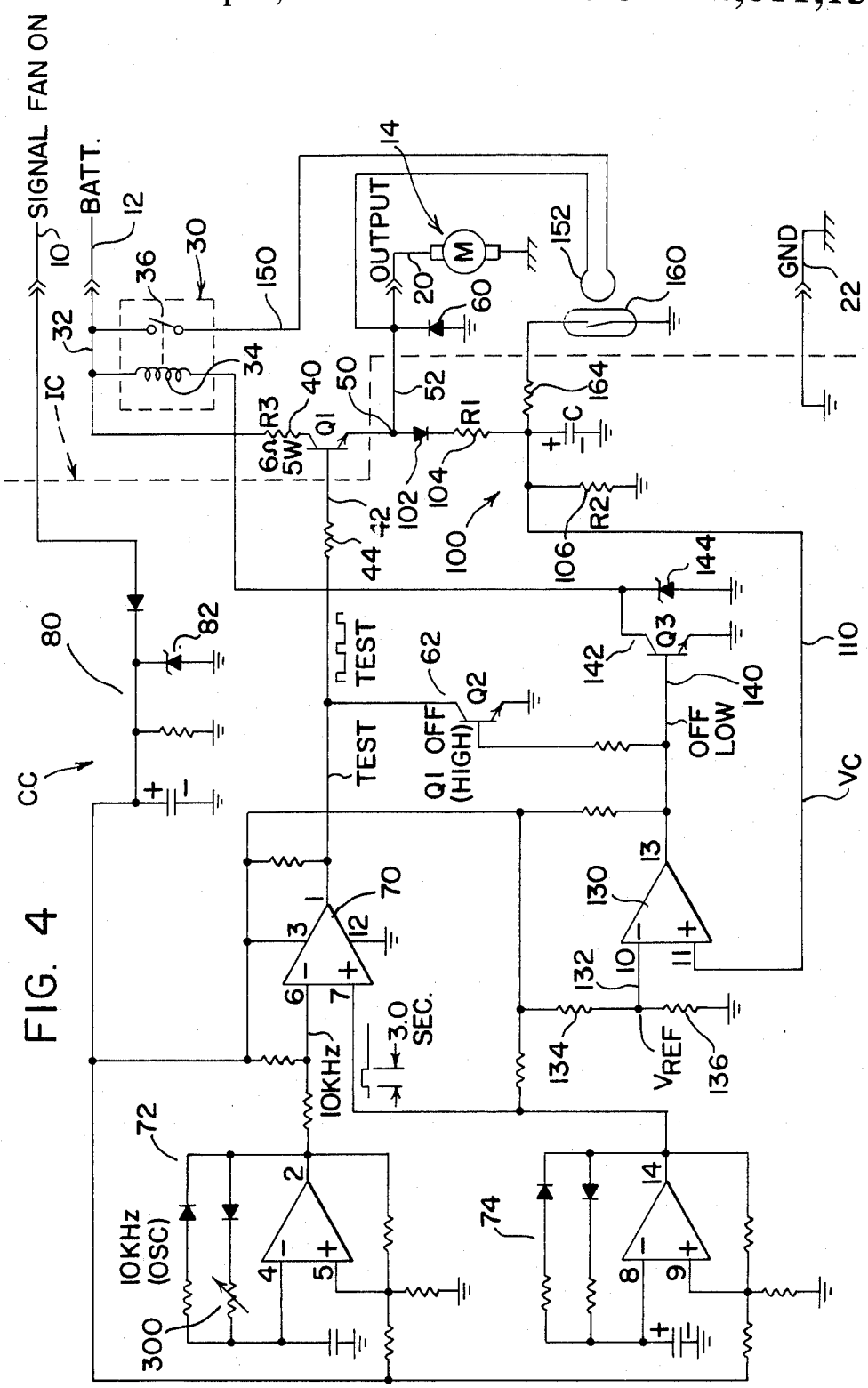
FIG. 4 is a detailed wiring diagram of a preferred embodiment of the present invention.

In the drawings which are for the purpose of illustrating a preferred embodiment of the invention only and not for the purpose of limiting same, FIGS. 1 and 4 show a control circuit CC constructed in accordance with the present invention and packaged with a power relay 30 onto a printed circuit board PC and including a semi-custom integrated circuit IC. This relay package is plugged into a motor vehicle at the various terminals illustrated in FIGS. 1 and 4. These plugin terminals include a connection to a fan operating switch 10 to actuate control circuit CC by applying a voltage to voltage regulator 80 (FIGS. 1 and 4). This operation is represented by the box 84 in FIG. 1 which can be a switch opened upon actuation of the comparator shown in FIG. 7. A battery connection 12 energizes a motor circuit 14 with a motor M connected by a harness 20 to relay 30. The package is also grounded by a chassis ground 22. The present invention relates to monitoring the motor circuit 14 for the purposes of actuating the somewhat standard power relay 30 as shown in FIG. 4 and having a battery input 32, a standard operating coil 34 and standard normally opened contacts 36. When the contacts are closed, high magnitude current is directed through motor M by connecting the motor with battery connection 12.

In accordance with the present invention, there is provided a testing network or means for directing high frequency, low duty cycle, low level current for a preselected testing cycle through motor circuit 14. This testing network, or means, includes a driving transistor Q1 formed as a discrete element on printed circuit board PC and a current limiting resistor 40, also a discrete component. Base lead 42 connects integrated circuit IC with the base of transistor Q1 for controlling the bias on the base through resistor 44. The output side of transistor Q1 is identified as control point 50 within the integrated circuit and adapted to control current flow through lead 52 to the motor circuit 14 during a testing cycle. Diodes 60 protect transistor Q1 in accordance with standard practice. To drive transistor Q1 through base lead 42, there is provided a disabling switch 62 in the form of transistor Q2, best shown in FIG. 4. A gate 70 has a first input from high frequency oscillator 72 which, in the preferred embodiment, oscillates at 10 KHz. The other input to gate 70 is a bistable oscillator 74 which, in the preferred embodiment, is at a logic 1 for 3.0 seconds and then at a logic 0 for 27.0 seconds. Thus, the high frequency pulses from oscillator 72 pass through gate 70 to the base lead 42 for creation of testing cycles having a time length of 3.0 seconds in the preferred embodiment. During the interval between testing cycles, the sensing capacitor is allowed to discharge. In practice, the interval is at least several times the length of the testing cycle.

In operation, as shown in FIG. 3, the voltage to base lead 42 is a series of pulses having a width of 30 microseconds and continuing for 3.0 seconds. The period of each pulse is 100 microseconds; therefore, transistor Q1 is on 30% of the time. Consequently, the duty cycle of the testing network is 30% in the preferred embodiment. When the testing circuit is operating during a testing cycle, transistor Q1 is operating in accordance with the upper graph of FIG. 3. This allows current flow through current limiting resistor 40 and through motor circuit 14. This testing current is of relatively low magnitude and, in practice, is substantially less than 1.0 amp maximum. At a 100% duty cycle, a current of 2.0 amps would be maximum when using a 6 ohms resistor 40. A duty cycle of 30% substantially reduces the maximum current flow through resistor 40 and thus through the motor circuit 14 during a testing cycle. If the motor is stalled or has a short circuit, current flow through the motor during the testing cycle is relatively high for the selected low current used in testing. Thus, the voltage drop across resistor 40 increases and the voltage or potential at point 50 as it relates to the ground potential is reduced. The motor and resistor 40 act as a voltage divider with control point 50 floating according to the condition of motor M and motor circuit 14. In this manner, the testing current provides only enough current to rotate the motor slowly and to allow monitoring at point 50.

Integrated circuit IC includes a voltage regulator 80 having a Zener diode 82. In practice, the regulator is set at 16 voltage level; therefore, circuit CC can experience at maximum, 16 volts of floating bias. Since all the circuits are floating with the battery potential, the integrated circuit is ratiometric and can be considered steady state. In other words, the refernece voltages and other voltage parameters will float with the biasing from the battery terminal 12 so that they do not fluctuate according to battery fluctuation.

In accordance with the preferred embodiment of the invention, the sensing or detecting network 100 includes capacitor C which is charged through diode 102 and resistor 104 having a relatively low resistance value. Thus, the capacitor C is charged by current from point 50 at a relatively low time constant toward a voltage established with the low level testing current. Resistor 106 has a high resistivity; therefore, capacitor C discharges relatively slowly during the 27.0 second interval between testing cycles or when the testing circuit is not in operation. Selection of the various values for resistors 104, 106 can be made in accordance with desired operation parameters. During the high frequency operation of transistor Q1 in a testing cycle, capacitor C charges to a voltage determined by the current characteristics of motor M or, more accurately, the total motor circuit 14. Thus, the voltage across the capacitor is indicative of the average voltage at point 50 and this average voltage will be relatively low if motor M is stalled or shorted. Such a condition draws higher current which increases the voltage drop across resistor 40 and reduces the voltage potential at point 50. The average voltage during the 3.0 second testing cycle is applied to line 110, which voltage is low when the motor is in a stalled or shorted condition. Under normal conditions, the voltage in line 110 is relatively high.

Referring now to the shifting means or network, this means or network includes a comparator 130 on integrated circuit IC having a reference voltage input 132 adjusted across resistors 134, 136. The other input to comparator 130 is control line 110 having the voltage sensed by capacitor C. When the voltage on line 110 exceeds the reference voltage on input 132, comparator 130 toggles output 140 which controls switch 142 having a protective diode 144. Consequently, when the voltage in line 110 is high enough to produce a logic 1 in line 140, switch 142 is actuated. This causes current flow through coil 34 to close contacts 36. In this manner, relay 30 is actuated and the battery connection, or terminal 12, is connected directly to the input of motor M through line 150. At the same time, line 140 actuates switch 62 formed by transistor Q2. This transistor grounds base line 42 and deactivates testing transistor Q1.

If the motor is operating normally, switch 142 is closed and relay 30 is actuated. On the other hand, if there is a short circuit or a stalled motor, the average voltage across capacitor C is lower than the reference voltage in comparator input 132. This holds line 140 to a logic 0 which blocks current flow through coil 34 and releases base line or lead 42. In this embodiment of the invention, there is a testing cycle after an interval of 27.0 seconds until the motor is in normal operation. Consequently, contacts 36 are not closed until the motor is in condition to operate normally. This prevents chatter and erosion of the contacts.

In accordance with another aspect of the invention, line 150 includes a loop 152 exposed to a magnetically actuated switch 160, in the form of a reed switch. This is a discrete component mounted on the printed circuit board PC as is the loop 152. If motor M, during operation, develops a high current situation, loop 152 which is approximately 182 of a loop of 12 gauge wire will create a sufficiently high magnetic field to close switch 160. This grounds capacitor C. Thus, line 110 is grounded in this condition. Consequently, output 140 of comparator 130 is toggled to a logic 0. Switch 142 is immediately turned off to open contact 36 of power relay 30. At the same time, switch 62 is turned off to start the previously described testing cycles. By providing this high current protection, circuit CC is shifted to the testing mode whenever an over-current condition exists in motor M. This feature, combined with the testing mode so far explained, gives substantial protection to motor M as described in the introductory portion of this application. Circuit CC remains in the testing mode for periodic testing cycles until the motor becomes operative. As will be described with respect to FIGS. 2A and 7, it is possible to provide a counter for accumulating the pulses from transistor Q1 to deactivate switch 84 after a certain number of testing cycles. Other arrangements could be provided for shutting down circuit CC when motor M has been inoperative for a preselected amount of time.

Figure 5:
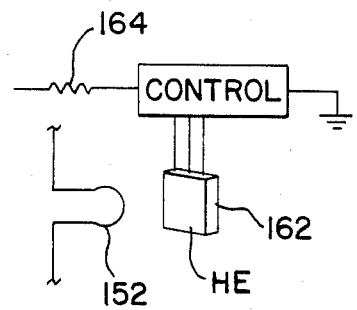
FIG. 5 is a schematic view showing the use of a Hall Effect switch for the purposes of detecting high current conditions in a slight modification of the preferred embodiment shown in FIG. 4.

Referring now to FIG. 5, the magnetically operated switch used for detecting high current conditions during operation of motor M can be a Hall Effect switch 162. Both switches 160, 162 are connected to capacitor C through resistor 164 which controls the rate at which capacitor C is discharged to ground by the magnetically operated switch. Of course, other magnetically operated switches could be used instead of reed switch 160 or Hall Effect switch 162.

Reset pulse 180 shown in the lower part of FIG. 3 is an external pulse which can be applied to line 140 for the purpose of actuating the testing mode of operation for circuit CC. A low logic pulse on line 140 opens switches 62, 142.

Referring now to FIG. 2, a flow diagram of the method employed in the preferred embodiment of the invention is illustrated.

Figure 7:
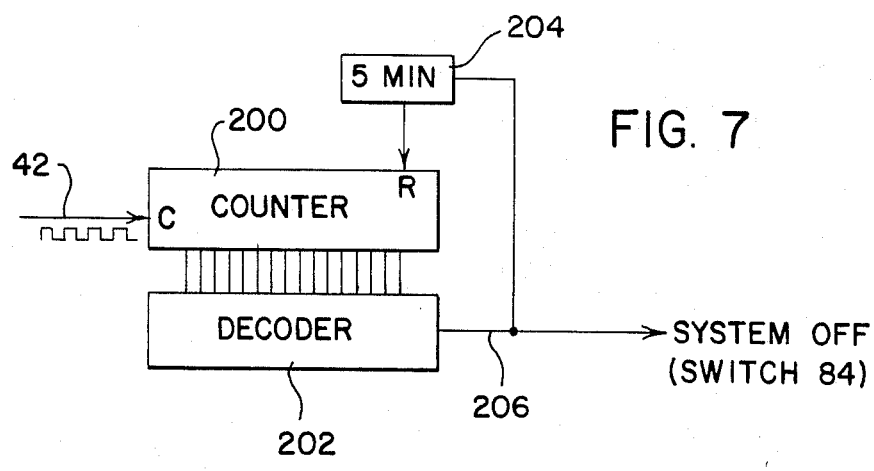
FIG. 7 is a schematic diagram of a counting circuit which can be used to deactivate the control circuit when a fault condition exists in the monitored motor.

During the testing cycle, with the power relay opened, a high frequency, low duty cycle, low magnitude current is passed through the motor circuit being monitored. If there is a short or stall, line 182 is energized. This turns on a light 190 exposed to a vehicle operator in the vehicle compartment and continues the successive testing cycle. If there is no short or stall detected during a particular test cycle, line 184 is energized. This line illustrates the function of closing the relay contacts and activating the high current monitoring portion of the invention employing either reed switch 160 or Hall Effect switch 162. If there is a high current detected, line 186 indicates the operation of opening the relay and again initiating the testing cycle illustrated as return line 182. This normal operation is modified slightly in the flow chart shown in FIG. 2A where a counter 200, as shown in FIG. 7, counts pulses in line 42. A decoder 202 determines when these pulses have reached a preselected value. At that time, a signal occurs in line 206 which deactivates circuit CC by opening switch 84 or by other means. Periodically, in the illustrated embodiment each 5.0 minutes, a timer 204 resets counter 200. Thus, if decoder 202 overflows within 5.0 minutes, the control circuit is shut down and reactivated again after 5.0 minutes. This reduces the operation of circuit CC when the motor remains in a fault condition for a prolonged time.

Figure 8:
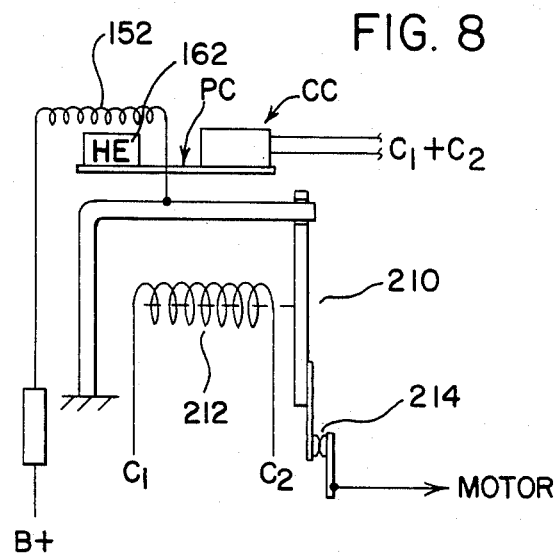
FIG. 8 is a side elevational view of a power relay adapted to be deenergized by high current detected with a Hall Effect switch.

Referring now to FIG. 8, an electrical mechanical relay 200 of the type employed in accordance with the present invention is schematically illustrated as including an operating coil 212 having input leads C1, C2 and normally opened contacts 214. The printed circuit board PC is mounted with respect to the relay and supports circuit CC. In this embodiment, the Hall Effect switch 162 is controlled by coil 212 having a magnetic flux field controlled by the current flow from the battery to the motor. In this illustration, circuit CC controls the current flow through lines C1, C2 for selectively energizing coil 212 in accordance with the current in the motor circuit during normal operation of the motor. This particular illustration shows certain physical components and does not illustrate the concept of the invention wherein the motor circuit is interrogated with the low current, low duty cycle from an auxiliary circuit as illustrated in FIGS. 1 and 4.

Figure 6:
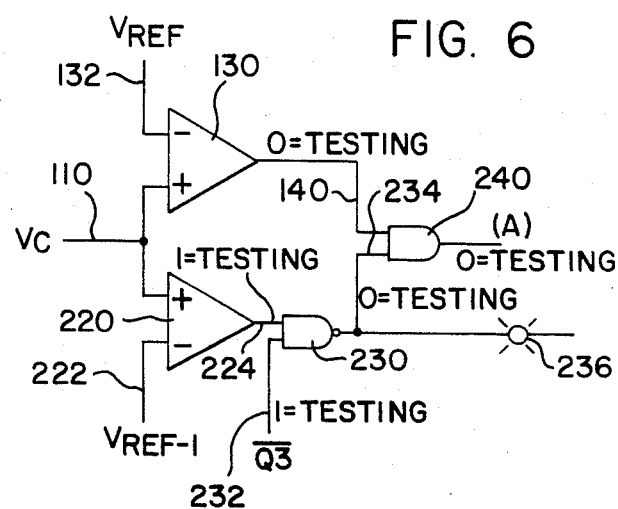
FIG. 6 is a logic diagram showing an additional feature to be incorporated into to modify a portion of the preferred embodiment of the invention to detect an open motor circuit as shown in FIG. 4.
Figure 6A:
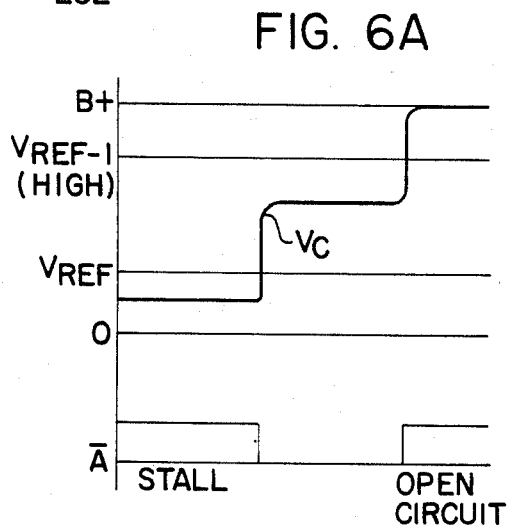
FIG. 6A is a graph illustrating characteristics of the voltage across the sensing capacitor and the related logic condition on output A of the circuit shown in FIG. 6.

In accordance with another aspect of the invention, it is desirable to prevent operation of relay 30 when there is no motor connected in the motor circuit or when the motor has an open circuit which will indicate a defective motor incapable of operation to cool the engine when needed. In accordance with this concept, a second comparator 220, as illustrated in FIG. 6, can be included in integrated circuit IC. FIG. 6 shows a modification of only a portion of the circuit shown in FIG. 4. This second comparator has a reference voltage input 222 to which the voltage VC in line 110 is compared. If the voltage applied to line 110 (See FIG. 4) is higher than the voltage in line 222, a testing signal is applied at the output 224 of comparator 220. Since this condition would exist whenever contacts 36 are closed, a NAND gate 230 is provided with a second input 232. This input is at a logic 1 when switch 142 is off. This is illustrated as Q3 in FIG. 6. A logic 1 in line 232 combined with a logic 1 in line 224 produces a testing logic 0 in line 234. Thus, if circuit CC is in the testing mode and contact 36 is opened, point 50 floats near the B+ voltage when there is an opened condition in the motor circuit 14. Capacitor C is charged directly through resistor 40 and resistor 104 toward the battery voltage. A logic 0 in line 234 also grounds indicator light 236 to indicate to the driver that there is no fan motor available for operation in the vehicle. This condition creates a logic 0 in line 234 to operate NAND gate 240 having an output A. The other input to the NAND gate is line 140 from comparator 130. In this manner, switch 142 remains open whenever there is a stalled condition, a short condition or the absence of a motor actually connected into the motor circuit during the testing cycle. Operation of this particular combined circuit is illustrated in FIG. 6A wherein the voltage VC produces a logic 0 whenever an abnormal condition is detected by the circuit shown in FIG. 6.

Figure 9:
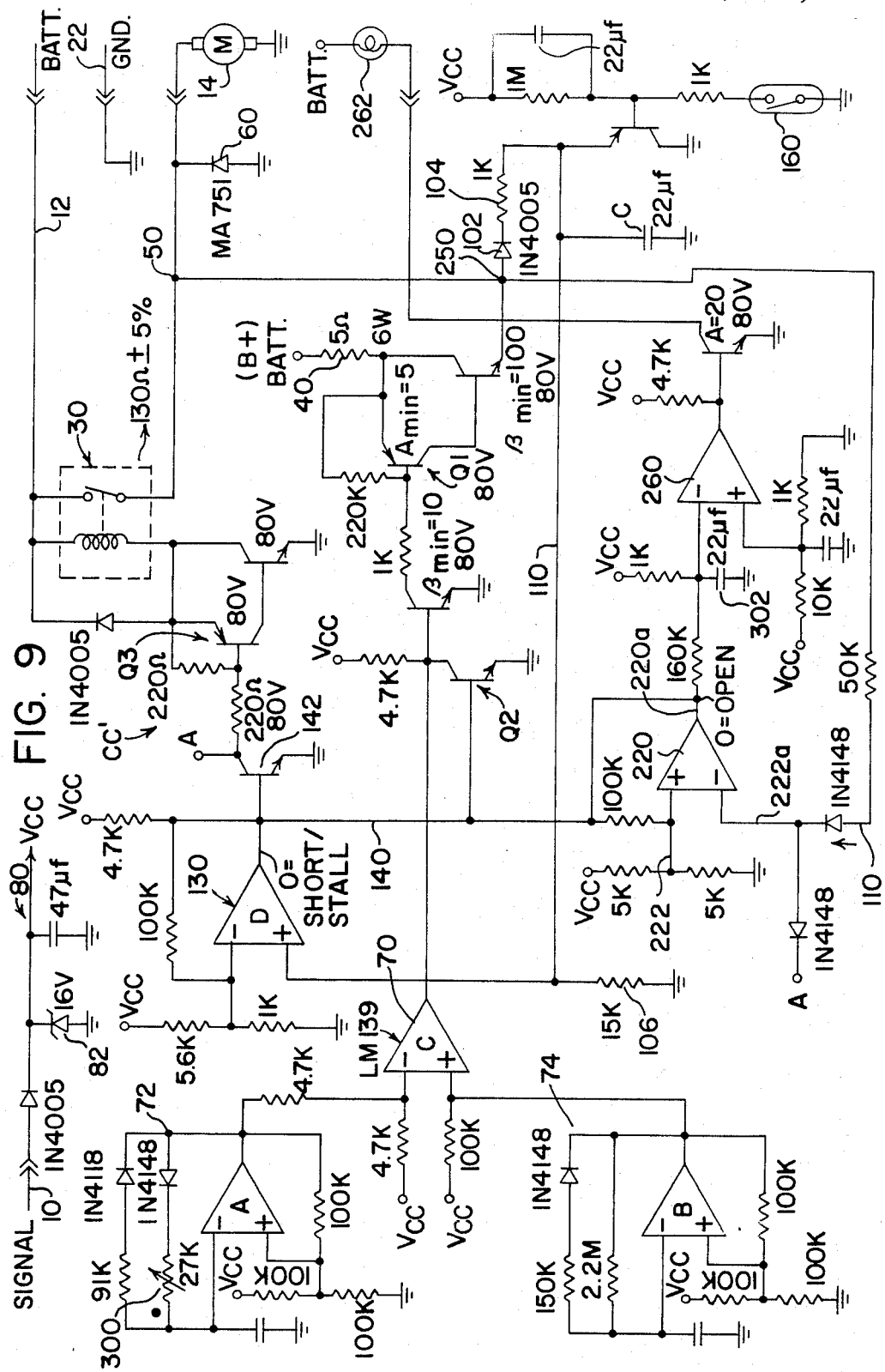
FIG. 9 is a detailed wiring diagram of the present embodiment of the invention showing certain components and slight modifications of the diagrams shown in FIG. 4 and FIG. 6.

Referring now to FIG. 9, a detailed wiring diagram of the present embodiment of the invention is illustrated wherein the control circuit CC' has essentially the features illustrated in FIGS. 4 and 6 with like components being provided with the same numbers. The voltage is provided by input circuit 80 having a 16.0 volt Zener diode 82. FIG. 9 is included only for the purposes of completing the disclosure and does not add substantially to the features already described in connection with the first preferred embodiment. A control point 250 corresponds to point 50 and is provided as the sensed voltage on input line 222a which is compared by comparator 220 with a reference voltage on line 222. The output 220a is at a logic 0 when the voltage at point 250 detects an open condition for motor M. This comparator operates in the same fashion as comparator 220, shown in FIG. 6. When testing transistor Q1 is closed and circuit 14 is open, point 250 will be driven toward the battery voltage since there will be low current flow through resistor 40. This gives a logic 0 in line 220a which prevents operation of transistor Q3 (142) and opens transistor Q2 (140). Consequently, testing continues in accordance with the previous description.

Comparator 130 provides a logic 0 whenever there is a short or stalled condition in motor M. In this manner, a logic 0 appears in line 140 by clamping the comparator 130 or comparator 220 to a logic 0 output indicating an open circuit, a short circuit or a stall condition for motor M. FIG. 9 also includes a lamp driver 260 controlled by the logic on line 140. This driver actuates a warning light 262 whenever a logic 0 appears on line 140. Consequently, light 262 is actuated whenever there is an open circuit, a shorted condition, or a stalled motor. This control circuit also incorporates a temperature responsive resistor 300 which will be described in more detail with respect to the disclosure of FIGS. 12 and 13.

Figure 10:
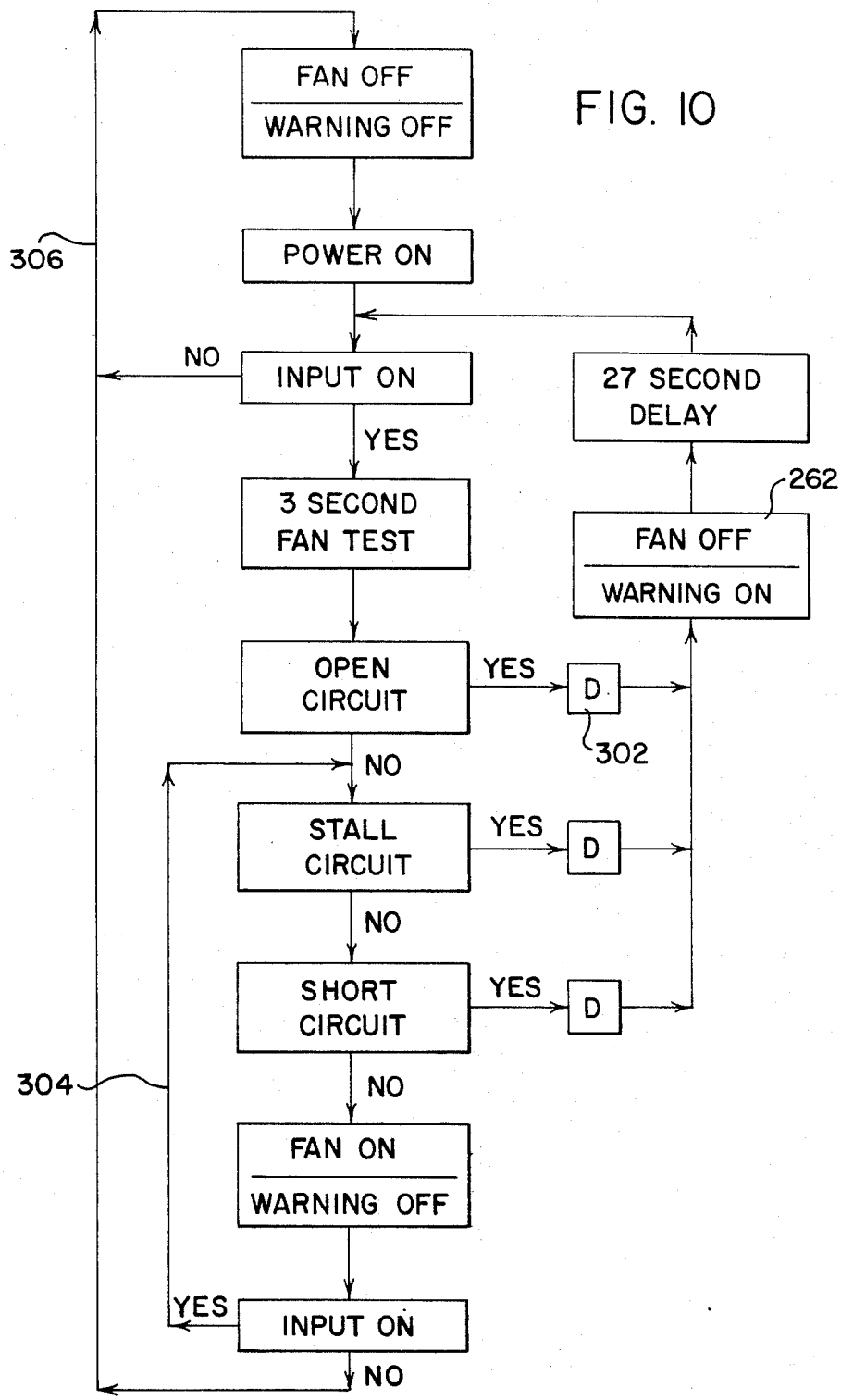
FIG. 10 is a flow diagram of the embodiment shown in FIG. 9.

FIG. 10 is a flow chart showing the opration of the circuit illustrated in FIG. 9. The chart is self-explanatory. If the input switch is on, the fan is tested for 3.0 seconds. The first test is for an open circuit by comparator 220. If there is an open circuit, there is a time delay caused by capacitor 302 shown in FIG. 9. After this delay, lamp 262 is shifted to the on condition and the fan is turned off in accordance with the logic in line 140.

After a preselected time, illustrated in FIG. 10 as 27.0 seconds, the testing cycle is continued. Should there be no open circuit, the motor is then tested for either stall or a short. If there is a stall or a short, lamp 262 is energized and testing continues. Assume that there is no open circuit, stall or short condition detected by logic 0 on line 140, the fan is turned on by a logic 1 in this line. Of course, the warning light is then off and the fan motor or other load is operating under normal conditions. As long as the input is on to continue operation of the fan or motor, reed switch 160 continues to check for a stalled condition or a short condition as represented by line 304. Should the fan be turned off, the input will not be on and the circuit shall shift into the static or waiting mode. This is represented by line 306.

Figure 11:
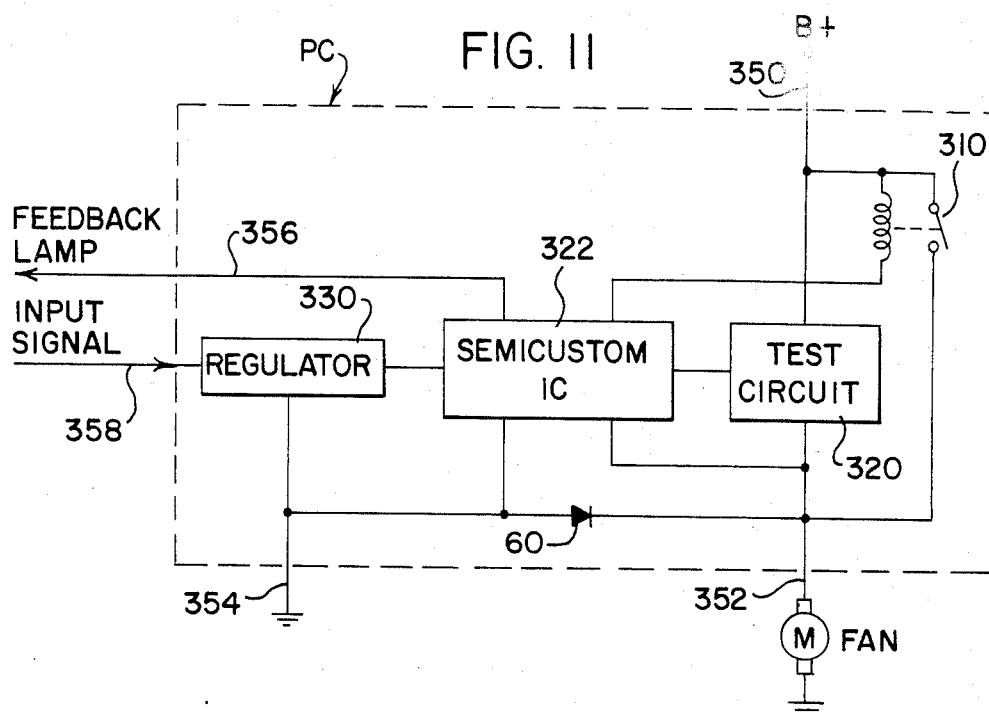
FIG. 11 is a block diagram showing connections needed when using the invention in a motor vehicle.

When the control circuit CC is installed in a motor vehicle, the automobile manufacturer is interested only in the particular connections which it must provide in the receptacle connector. The printed circuit board PC, including the control circuit of the present invention, is schematically illustrated in FIG. 11. This illustration includes a mechanical relay 310, the testing circuit 320 and a semi-custom integrated circuit 322. The ratiometric voltage regulator 330 and a flyback diode 340 corresponding with diode 60 in FIGS. 4 and 9 are also provided on printed circuit board PC. This board includes a battery terminal or connection 350, a fan or load connection 352, a ground connection 354, a detector light connection 356 and an input signal connection 358. By providing these particular terminals in the plug or receptacle, printed circuit board PC can be inserted directly into the motor vehicle for the purposes of protecting a load, illustrated as a fan motor M.

Figure 12:
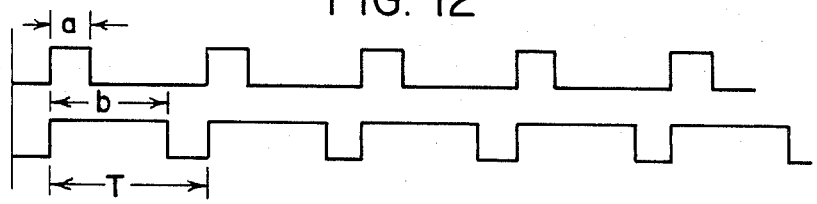
FIG. 12 is a pulse chart showing the temperature compensating feature of resistor 300.
Figure 13:
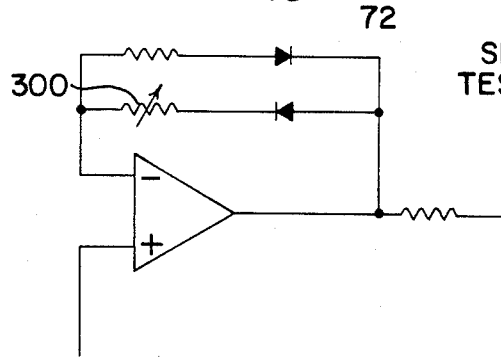
FIG. 13 is a partial wiring diagram showing the pulse generator or oscillator 72 with the temperature compensating resistor 300 added to obtain the pulse modification shown in FIG. 12; and, FIG. 14 is a partial wiring diagram of a modified circuit to shift the control circuit into the test mode upon sensing a fault when motor M is operating.

When operating control circuit CC for the purposes of testing a DC motor, it has been found that an increased current may be required as ambient temperature decreases. This assures at least slow rotation of a freely rotatable motor, even at low temperatures. To accomplish this objective, resistor 300 is provided as a standard resistor having an increased resistance as temperature increases. In some instances a thermistor may be employed for this purpose. This aspect of the invention is illustrated in FIG. 13 wherein the 10 KHz oscillator 72 is provided with a temperature responsive resistor 300. An increase in the pulse width occurs as temperature decreases. This concept is illustrated in FIG. 12 wherein the normal pulse width a is increased to a greater pulse width b as temperature sensed by resistor 300 is decreased. As can be seen, the standard 10 KHz operating frequency is employed since most ICs for motor circuits operate at this nominal frequency.

Figure 14:
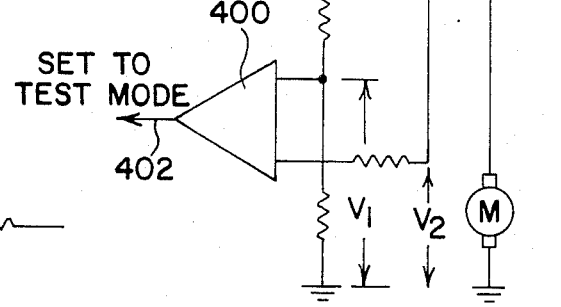

As a final modification of the present invention, FIG. 14 shows a comparator 400 which compares a voltage V2 which is essentially the load voltage with a voltage V1 which is controlled by the battery. The comparator 400 is employed as a monitor for the motor M or motor circuit 14 during operation of the motor. When a stalled or short condition occurs, V2 increases substantially. This is compared to a fixed voltage V1 controlled by the battery of the motor vehicle. As V2 substantially increases over V1, an output signal is created by comparator 400 in its output line 402. This deactivates the power switch and sets control circuit CC or CC' into its testing mode. This type of detector could be employed instead of the reed switch 160 or the Hall Effect switch. Of course, other arrangements could be provided for monitoring the motor circuit or load to open the power switch whenever the load is experiencing a high current damaging condition.

Having thus described the invention, the following is claimed:

1. A control circuit for operating a power switch having nonconductive and conductive conditions and adapted to direct a normal driving current from a power supply through an electric load circuit when the switch is in its conductive condition, said control circuit comprising: testing means for directing a testing current through said load circuit while said switch is in said nonconductive condition, said testing current having a magnitude substantially less than said normal driving current, sensing means for creating a control signal with a value indicative of a predetermined electrical characteristic in said load circuit, shifting means for shifting said switch into said conductive condition only when said value of said control signal has a preselected value, and protecting means for interrupting said driving current flowing through said load circuit when said driving current exceeds a preselected current level.

2. A control circuit as defined in claim 1 wherein said shifting means includes a comparator means having an output and means for setting said output to a given condition when said control signal value exceeds a reference signal and means for shifting said power switch to said conductive condition in response to said output being set to said given condition.

3. A control circuit as defined in claim 2 including means for deactivating said testing means when said output is set to said given condition.

4. A control circuit as defined in claim 2 including means for adjusting said reference signal in accordance with fluctuation in said power supply.

5. A control circuit as defined in claim 1 wherein said protecting means includes detector means for detecting current flow above a given level to said motor circuit from said power supply when said power switch is in said conductive condition and means for shifting said power switch to said nonconductive condition when said current flow has been detected.

6. A control circuit as defined in claim 1 wherein said testing means includes a transistor and a drive circuit for driving said transistor at a high frequency to pass said testing current to said load circuit and including an integrated circuit comprising said drive circuit and said shifting means and a printed circuit board onto which said integrated circuit is mounted and means for mounting onto said printed circuit board said power switch, said transistor and said protecting means.

7. A control circuit as defined in claim 1 wherein said load circuit is a D.C. motor circuit of the type used in a motor vehicle.

8. A control circuit as defined in claim 7 wherein said current responsive means is a magnetically operated switch means controlled by a magnetic field having a magnitude proportional to current flow in said motor circuit, said switch means being connected to discharge said capacitor below said preselected reference voltage whereby said power switch is shifted to said opened condition.

9. A control circuit as defined in claim 1 wherein said load circuit is a lamp circuit of the type used in a motor vehicle.

10. A control circuit as defined in claim 1 wherein said power switch is a mechanical relay.

11. A control circuit as defined in claim 1 wherein said power switch is a FET.

12. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said low magnitude testing current is a series of pulses created by said power supply.

13. A control circuit as defined in claim 12 wherein said pulses form a high frequency chain of pulses having a duty cycle substantially less than 100%.

14. A control circuit as defined in claim 13 wherein said duty cycle is less than 50%.

15. A control circuit as defined in claim 13 including means for adjusting said duty cycle in response to changes in ambient temperature.

16. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said testing means includes a switch means connecting said load circuit with said power supply through a current limiting resistor and means for actuating said switch means at a high frequency.

17. A control circuit as defined in claim 16 wherein said switch means is a transistor and said actuating means includes an oscillator means for creating a high frequency control signal and means for gating said transistor by said high frequency control signal.

18. A control circuit as defined in claim 17 including gating means for applying said control signal to said transistor for a selected time.

19. A control circuit as defined in claim 17 wherein said gating means includes a bistable oscillator having a first condition applying said control signal to said transistor for a first period matching said selected time and a second condition isolating said control signal from said transistor for a second period greater than said selected time.

20. A control circuit as defined in claim 19 wherein said second period is several times said first period.

21. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said testing means includes an auxiliary circuit having a transistor and current limiting resistor in series with said load circuit, means for applying said power supply across said auxiliary circuit and said load circuit, and means for actuating said transistor at a controlled pulse rate by a pulsing control signal.

22. A control circuit as defined in claim 21 including gating means for applying said control signal to said transistor for a selected time.

23. A control circuit as defined in claim 22 wherein said gating means includes a bistable oscillator having a first condition applying said control signal to said transistor for a first period matching said selected time and a second condition isolating said control signal from said transistor for a second period greater than said selected time.

24. A control circuit as defined in claim 23 wherein said second period is several times said first period.

25. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said sensing means includes a capacitor connected between a selected location in said load circuit and to ground, means for charging said capacitor to an average voltage indicative of current flow in said load circuit at least when said testing current is applied through said load circuit and means for creating said control signal by the charged voltage on said capacitor.

26. A control circuit as defined in claim 25 wherein said charging means includes a relatively low resistance resistor and a relatively high resistance resistor connecting said capacitor to ground whereby said capacitor is charged rapidly and discharged slowly.

27. A control circuit as defined in claim 25 wherein said shifting means includes a comparator means having an output and means for setting said output to a given condition when said control signal exceeds a reference signal and means for shifting said power switch in response to said output being set to said given condition.

28. A control circuit as defined in claim 27 including means for deactivating said testing means when said output is set to said given condition.

29. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, including means for deactivating said testing means in response to actuation of said shifting means.

30. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said load circuit is a DC motor circuit and said control signal of said sensing means is a variable voltage signal created by flow of said testing current in said motor circuit and having a relatively low value below said preselected value when said motor circuit has a high current indicative of a stall of a motor in said motor circuit or a short in said motor circuit and said shifting means includes a comparator means for comparing said variable voltage signal with a reference voltage signal and said preselected value of said control signal occurring when said variable voltage signal exceeds said reference voltage signal.

31. A control circuit as defined in claim 30 wherein said variable voltage signal created by flow of said testing current in said motor circuit has a relatively high value above said preselected value when said motor circuit has low current indicative of an open circuit or a disconnected motor in said motor circuit and said shifting means includes a second comparator means for comparing said variable voltage signal with a second reference voltage and said preselected value of said control signal occurring when said variable voltage signal exceeds said first mentioned reference voltage signal and is less than said second reference voltage.

32. A control circuit as defined in claim 31 including means for deactivating said testing means when said control signal has said selected value.

33. A control circuit as defined in claim 30 including means for deactivating said testing means when said control signal has said selected value.

34. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, including means for deactivating said testing means when said control signal has said selected value.

35. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, said protecting means including detector means for detecting current flow above a given level to said motor circuit from said power supply when said power switch is in said conductive condition and means for shifting said power switch to said nonconductive condition when said current flow has been detected, wherein said detector means is a magnetically operated switch, means for operating said magnetically operated switch when said magnetically operated switch is exposed to a magnetic field above a given level, means for creating a magnetic field with a level proportional to current flow to said load circuit from said power supply when said power switch is in said conductive condition, means for exposing said created field to said magnetically operated switch and means for shifting said power switch to said nonconductive condition when said switch is operated.

36. A control circuit as defined in claim 35 wherein said switch is a reed switch.

37. A control circuit as defined in claim 35 wherein said switch is a Hall Effect switch.

38. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, wherein said control signal of said sensing means is a variable voltage created by flow of said testing current in said load circuit and said shifting means includes a comparator means for comparing said variable voltage signal with a reference voltage signal and said preselected value of said control signal occurring when said variable voltage signal exceeds said reference voltage signal.

39. A control circuit for operating a power switch having nonconductive and conductive conditions and adapted to direct a high magnitude driving current from a power supply through an electric load circuit when the switch is in its conductive condition, said control circuit comprising: testing means for directing a low magnitude testing current through said load circuit while said switch is in said nonconductive condition, sensing means for creating a control signal indicative of a predetermined electrical characteristic in said load circuit, shifting means for shifting said switch into said conductive condition only when said control signal has a preselected value, and protecting means for interrupting said high magnitude driving current flowing through said load circuit when said driving current exceeds a preselected value, including means for increasing said low magnitude testing current as ambient temperature decreases.

40. A control circuit for operating a power switch having opened and closed conditions and adapted to direct a driving, high magnitude current from a power supply through an electric motor circuit when the power switch is in the closed condition, said control circuit comprising: an auxiliary testing circuit for passing a low magnitude current from said power supply through said motor circuit at least during a testing cycle, said auxiliary testing circuit including a transistor and means for gating said transistor at a high frequency during said testing cycle to control the current flow while said power switch is in the opened condition to a relatively low level; a capacitor having a voltage indicative of the current flow in said motor citcuit; means for shifting said power switch into said closed condition only when said capacitor voltage exceeds a preselected reference voltage; and current responsive means for shifting said power switch to said opened condition when current flow through said motor circuit exceeds a preselected value.

41. A control circuit as defined in claim 40 wherein said power switch is a mechanical relay.

42. A control circuit as defined in claim 40 wherein said power switch is a FET.

43. A control circuit as defined in claim 40 including means for increasing said low magnitude testing current as ambient temperature decreases.

44. A method of sensing a stalled or short condition in a motor circuit including the winding of an electric motor to be driven by a relatively high current from a D.C. power supply, said method comprising the steps of:
(a) passing a low magnitude testing current through said motor circuit;
(b) measuring the average voltage across the motor of said motor circuit during a testing cycle of a given time length while only said testing current is flowing through said motor circuit;
(c) comparing said average voltage with a reference signal; and,
(d) passing said high current through said motor circuit when said comparison is at a given relationship of the average voltage and the reference signal.

45. A method of sensing a stalled or short condition in a motor circuit including the winding of an electric motor to be driven by relatively high current from a D.C. power supply, said method comprising the steps of:
(a) passing a low magnitude testing current through said motor circuit;
(b) measuring the average voltage across the motor of said motor circuit during a testing cycle while only said testing current is flowing through said motor circuit;
(c) comparing said average voltage with a reference signal;
(d) passing said high current through said motor circuit when said comparison is at a given relationship of the average voltage and the reference signal; and,
(e) adjusting said testing current in accordance with changes in ambient temperature.

46. Apparatus for sensing a stalled or short condition in a motor circuit including the winding of an electric motor to be driven by a relatively high current from a DC power supply, said apparatus comprising: testing means for passing a low duty cycle limited current through said motor circuit; means for measuring the average voltage across the motor of said motor circuit during a testing cycle while only said limited current is flowing through said motor circuit; means for comparing said average voltage with a reference signal; and, means for passing said high current through said motor circuit when said comparison is at a given relationship of the average voltage and the reference signal.

47. An apparatus as defined in claim 46 including means for inhibiting said testing means when said high current is passing through said motor circuit.

48. An apparatus as defined in claim 47 further including means responsive to a preselected high current in said motor circuit for deactivating said high current passing means and for initiating said testing means.

49. An apparatus as defined in claim 46 wherein said testing means includes a current limiting resistor through which said limited current passes.

50. An apparatus as defined in claim 49 futher including means responsive to a preselected high current in said motor circuit for deactivating said high current passing means and for initiating said testing means.

51. An apparatus as defined in claim 46 further including means responsive to a preselected high current in said motor circuit for deactivating said high current passing means and for initiating said testing means.

52. An apparatus as defined in claim 46 including compensating means for adjusting said limited current in accordance with ambient temperature.

53. An apparatus as defined in claim 52 wherein said compensating means includes means for changing the duty cycle of said limited current in accordance with ambient temperature.

54. Apparatus for sensing a stalled or short condition in a motor circuit including the winding of an electric motor to be driven by a relatively high current from a DC power supply, said apparatus comprising: testing means for passing a low duty cycle limited current through said motor circuit; means for measuring the average voltage across the motor of said motor circuit during a testing cycle while only said limited current is flowing through said motor circuit; means for comparing said average voltage with a reference signal; and, means for passing said high current through said motor circuit when said comparison is at a given relationship of the average voltage and the reference signal, wherein said testing means includes means for applying pulses of current from said power supply through said motor circuit during said testing cycle, said pulses forming said limited current.

55. An apparatus as defined in claim 54 wherein said testing means includes means for repeating a testing cycle after a given time delay.

56. An apparatus as defined in claim 55 including means for inhibiting said testing means when said high current is passing through said motor circuit.

57. An apparatus as defined in claim 56 wherein said testing means includes a current limiting resistor through which said limited current passes.

58. An apparatus as defined in claim 57 further including means responsive to a preselected high current in said motor circuit for deactivating said high current passing means and for initiating said testing means.

59. An apparatus as defined in claim 54 further including means responsive to a preselected high current in said motor circuit for deactivating said high current passing means and for initiating said testing means.

* * * * *